(12) United States Patent
Lu et al.

(10) Patent No.: US 8,943,572 B2
(45) Date of Patent: Jan. 27, 2015

(54) METHOD FOR ACCESSING A STORAGE SERVER OF AN IM SERVICE SYSTEM, AND AN IM SERVICE SYSTEM

(75) Inventors: Yan Lu, Shenzhen (CN); Man Xie, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 31 days.

(21) Appl. No.: 13/582,803

(22) PCT Filed: Mar. 1, 2011

(86) PCT No.: PCT/CN2011/071434
§ 371 (c)(1),
(2), (4) Date: Oct. 26, 2012

(87) PCT Pub. No.: WO2011/140852
PCT Pub. Date: Nov. 17, 2011

(65) Prior Publication Data
US 2013/0125227 A1    May 16, 2013

(30) Foreign Application Priority Data
May 11, 2010    (CN) .......................... 2010 1 0183338

(51) Int. Cl.
*H04L 29/06*    (2006.01)
*H04L 12/58*    (2006.01)
*G06F 21/41*    (2013.01)

(52) U.S. Cl.
CPC ............. *H04L 51/04* (2013.01); *H04L 63/0815* (2013.01); *G06F 21/41* (2013.01)
USPC ........................................................... 726/8

(58) Field of Classification Search
None
See application file for complete search history.

(56) References Cited

U.S. PATENT DOCUMENTS

| 2006/0059240 | A1 | 3/2006 | Qin et al. |
| 2008/0134295 | A1* | 6/2008 | Bailey et al. ...................... 726/4 |
| 2010/0131470 | A1* | 5/2010 | Schmidt ........................ 707/665 |

FOREIGN PATENT DOCUMENTS

| CN | 1471265 A | 1/2004 |
| CN | 1237757 C | 1/2006 |

(Continued)

OTHER PUBLICATIONS

U.S. Patent Publication No. 2006/0059240 A1, to Qin, et al., published Mar. 16, 2006.

*Primary Examiner* — David Pearson
(74) *Attorney, Agent, or Firm* — Koppel, Patrick, Heybl & Philpott (57) ABSTRACT

The present invention discloses a method for accessing a storage server of an IM service system and an IM service system. The method comprises: IM client sending registration request message to IM service system using first user identifier; after receiving registration request message, IM service system obtaining other user identifiers associated with the first user identifier, sending registration success response message comprising other user identifiers associated with the first user identifier to IM client; IM storage client sending login request comprising any one of multiple user identifiers to storage server; storage server receiving login request and obtaining other user identifiers associated with the user identifier in login request; the storage server passing identity verification of multiple user identifiers. The problem of repeat login of a user with multiple identifiers is effectively solved when accessing a storage server, the system access efficiency is improved and the user experience is enhanced.

15 Claims, 6 Drawing Sheets

(56) References Cited

FOREIGN PATENT DOCUMENTS

| CN | 1855843 A | 11/2006 |
| CN | 101072103 A | 11/2007 |
| CN | 100438432 C | 11/2008 |
| CN | 101072103 B | 9/2010 |
| JP | 2006527432 T | 11/2006 |
| WO | WO2004112315 A1 | 12/2004 |

* cited by examiner

METHOD FOR ACCESSING A STORAGE SERVER OF AN IM SERVICE SYSTEM, AND AN IM SERVICE SYSTEM

This is a National Stage Application of PCT/CN2011/071434 filed Mar. 1, 2011 published as WO 2011/140852 A1, and claiming priority from CN201010183338.7 filed May 11, 2010.

FIELD OF THE INVENTION

The present invention relates to the field of mobile communication technologies, in particular to a method for accessing a storage server of an Instant Message (IM) service system, and an IM service system.

BACKGROUND OF THE INVENTION

At present, more and more users are using IM services. These IM services provide a network storage function, thus the users can look up the chat history at any time by accessing a storage server.

When using an IM service, a user needs to register and log in an IM service system, which is commonly referred to as "get online" The IM system distinguishes users by assigning different user identifiers (or called user addresses or user accounts) for different users. The user performs login registration and intercommunication using this user identifier. In order to improve the user experience, more and more cell phones support "multi-identifier" function, that is, a user can possess a plurality of user identifiers, and the plurality of user identifiers can be registered to be online simultaneously, also can be used in different time period respectively. An IM storage service is that the IM system stores message records associated with the user identifier to a specific storage server, and the user accesses the storage server using the user identifier through an IM client. During accessing, the storage server needs to authenticate the identity of the user (that is, the storage server confirms the identity of the user identifier); after the authentication is passed, the user can operate the stored message records.

Taking a typical Converged IP Messaging (CPM) service of IM for example, the CPM is proposed by the Open Mobile Architecture (OMA) in 2005, with a purpose of implementing the intercommunication among multiple message services, providing a uniform message service and perfecting consistent and convenient message service experience. The CPM combines multiple existing message services, comprising IM, Push-To-Talk over Cellular (POC), Mobile E-Email (MEM), Short Messaging Service (SMS), Multimedia Messaging Service (MMS), etc.

At present, the OMA is establishing CPM V1.0 standards. The service forms of the CPM comprise: CPM based on pager-mode, Large Message Mode CPM Message based on session-mode, other CPM session services based on session. Before a user normally uses these services, the user needs to register and log in a CPM system, commonly referred to as "get online", or referred to as "available in the CPM system".

A CPM addresses are identifiers used for distinguishing different users in the CPM system (also referred to as CPM Enabler, i.e. CPM service engine). In order to improve the user experience, in the CPM system, one user can possess multiple CPM addresses and can be registered on multiple terminal devices, that is, "be online" simultaneously. When a user accesses a CPM storage server, the server needs to authenticate the identity of the user; after the authentication is passed, the user can access message records associated with the authenticated user address.

The inventor finds that the following problem appears in an IM system supporting multiple user addresses when a user accesses a storage server: the user conducts communication through a certain user identifier and communication message records associated with the identifier are stored in a storage server; when the user changes to another user identifier to conduct communication, each time the user identifier is changed, an identity authentication is needed again before the user accesses the storage server. That is to say, when a user with a plurality of identifiers accesses the storage server, the user must log in using multiple identifiers repeatedly to acquire the stored messages corresponding to the multiple identifiers, but can not acquire the stored message records of multiple associated identifiers of the user simultaneously.

SUMMARY OF THE INVENTION

The present invention provides a method for accessing a storage server of an IM service system, and an IM service system, which solve the problem of repeat login of a user with a plurality of identifiers when the user accesses a storage server.

According to one aspect of the present invention, a method for accessing a storage server of an IM service system is provided, comprising the steps of: an IM client sending a registration request message to the IM service system using a first user identifier; after receiving the registration request message from the IM client, the IM service system inquiring preset user identifier association information and obtaining other user identifiers associated with the first user identifier; the IM service system sending a registration success response message to the IM client, wherein the registration success response message comprises other user identifiers associated with the first user identifier; an IM storage client sending a login request to the storage server, wherein the login request comprises any one user identifier of a plurality of user identifiers, wherein the plurality of user identifiers comprise the first user identifier and other user identifiers associated with the first user identifier; the storage server receiving the login request of the IM storage client, inquiring the preset user identifier association information, and obtaining other user identifiers associated with the user identifier comprised in the login request; and the storage server passing identity verification of the user identifier comprised in the login request and other user identifiers associated with the user identifier.

Preferably, before the step of the IM service system sending the registration success response message to the IM client, the method further comprises a step of: the IM service system accomplishing authentication of the first user identifier and other user identifiers associated with the first user identifier; before the step of the storage server passing the identity verification of the user identifier comprised in the login request and other user identifiers associated with the user identifier, the method further comprises a step of: the storage server accomplishing authentication of the user identifier comprised in the login request and other user identifiers associated with the user identifier.

Preferably, the step of the storage server accomplishing the authentication of the user identifier comprised in the login request and other user identifiers associated with the user identifier comprises a step of: the storage server acquiring an authentication result of the IM service system and accomplishing the authentication of the user identifier comprised in the login request and other user identifiers associated with the user identifier; or, the storage server authenticating the user identifier comprised in the login request and other user identifiers associated with the user identifier, wherein the authentication of the user identifiers by the storage server is independent of the authentication of the user identifiers by the IM service system.

Preferably, the step of the IM service system inquiring the preset user identifier association information and obtaining other user identifiers associated with the first user identifier comprises a step of: the IM service system searching, in the preset user identifier association information, for a user corresponding to the first user identifier and obtaining the user's other user identifiers associated with the first user identifier.

Preferably, the step of the storage server inquiring the preset user identifier association information and obtaining other user identifiers associated with the user identifier comprised in the login request comprises a step of: the storage server searching, in the preset user identifier association information, for a user corresponding to the user identifier comprised in the login request and obtaining the user's other user identifiers associated with the user identifier comprised in the login request.

According to another aspect of the present invention, a method for accessing a storage server of an IM service system is provided, comprising the steps of: an IM client sending a registration request message to the IM service system using a first user identifier; after receiving the registration request message from the IM client, the IM service system inquiring preset user identifier association information and obtaining other user identifiers associated with the first user identifier; the IM service system sending a registration success response message to the IM client, wherein the registration success response message comprises other user identifiers associated with the first user identifier; an IM storage client sending a login request to a storage server, wherein the login request comprises a plurality of user identifiers, wherein the plurality of user identifiers comprise the first user identifier and other user identifiers associated with the first user identifier; and the storage server receiving the login request and passing identity verification of the plurality of user identifiers comprised in the login request.

Preferably, before the step of the IM service system sending the registration success response message to the IM client, the method further comprises a step of: the IM service system accomplishing authentication of the first user identifier and other user identifiers associated with the first user identifier; before the step of the storage server passing the identity verification of the plurality of user identifiers comprised in the login request, the method further comprises a step of: the storage server accomplishing authentication of the plurality of user identifiers comprised in the login request.

Preferably, the step of the storage server accomplishing the authentication of the plurality of user identifiers comprised in the login request comprises a step of: the storage server acquiring an authentication result of the IM service system and accomplishing the authentication of the user identifier and other user identifiers associated with the user identifier comprised in the login request; or, the storage server authenticating the user identifier and other user identifiers associated with the user identifier comprised in the login request, wherein the authentication of the user identifiers by the storage server is independent of the authentication of the user identifiers by the IM service system.

Preferably, the step of the IM service system inquiring the preset user identifier association information and obtaining other user identifiers associated with the first user identifier comprises a step of: the IM service system searching, in the preset user identifier association information, for a user corresponding to the first user identifier and obtaining the user's other user identifiers associated with the first user identifier.

According to still another aspect of the present invention, an IM service system is provided, comprising: an IM client, configured to send a registration request message to the IM service system using a first user identifier and receive a registration success response message sent by the IM service system, wherein the registration success response message comprises other user identifiers associated with the first user identifier and obtained by the IM service system through inquiring preset user identifier association information; an IM storage client, configured to send a login request to a storage server, wherein the login request comprises any one user identifier of a plurality of user identifiers, wherein the plurality of user identifiers comprise the first user identifier and other user identifiers associated with the first user identifier; and the storage server, configured to receive the login request of the IM storage client, inquire the preset user identifier association information, obtain other user identifiers associated with the user identifier comprised in the login request, and pass identity verification of the user identifier comprised in the login request and other user identifiers associated with the user identifier.

Preferably, the IM client is further configured to request the IM service system to authenticate the first user identifier and other user identifiers associated with the first user identifier.

Preferably, the storage server is further configured to acquire an authentication result of the user identifier comprised in the login request and other user identifiers associated with the user identifier from the IM service system, and accomplish the authentication of the user identifier comprised in the login request and other user identifiers associated with the user identifier; or, the storage server is further configured to authenticate the user identifier comprised in the login request and other user identifiers associated with the user identifier, wherein the authentication of the user identifiers by the storage server is independent of the authentication of the user identifiers by the IM service system.

According to still another aspect of the present invention, an IM service system is provided, comprising: an IM client, configured to send a registration request message to the IM service system using a first user identifier and receive a registration success response message from the IM service system, wherein the registration success response message comprises other user identifiers associated with the first user identifier and obtained by the IM service system by inquiring preset user identifier association information; an IM storage client, configured to send a login request to a storage server, wherein the login request comprises a plurality of user identifiers, wherein the plurality of user identifiers comprise the first user identifier and other user identifiers associated with the first user identifier; and the storage server, configured to receive the login request and pass identity verification of the plurality of user identifiers comprised in the login request.

Preferably, the IM client is further configured to request the IM service system to authenticate the first user identifier and other user identifiers associated with the first user identifier.

Preferably, the storage server is further configured to acquire an authentication result of the user identifier and other user identifiers associated with the user identifier comprised in the login request from the IM service system, and accomplish authentication of the plurality of user identifiers comprised in the login request; or, the storage server is further configured to authenticate the plurality of user identifiers comprised in the login request, wherein the authentication of the user identifiers by the storage server is independent of the authentication of the user identifiers by the IM service system.

The present invention acquires, through one user identifier of the same user, a plurality of user identifiers associated this user identifier to access a storage server, so that the user can realize the storage access of multiple user identifiers using one user identifier, thus the problem of repeat login of a user with a plurality of identifiers is effectively solved when accessing a storage server, the system access efficiency is improved and the user experience is enhanced.

BRIEF DESCRIPTION OF THE DRAWINGS

Drawings, provided for further understanding of the present invention and forming a part of the specification, are used to explain the present invention together with embodiments of the present invention rather than to limit the present invention, wherein.

DETAILED DESCRIPTION OF THE EMBODIMENTS

The present invention is described below in detail by reference to the accompanying drawings in conjunction with embodiments. It should be noted that the embodiments in the application and the characteristics of the embodiments can be mutually combined if no conflict is caused.

Figure 1:
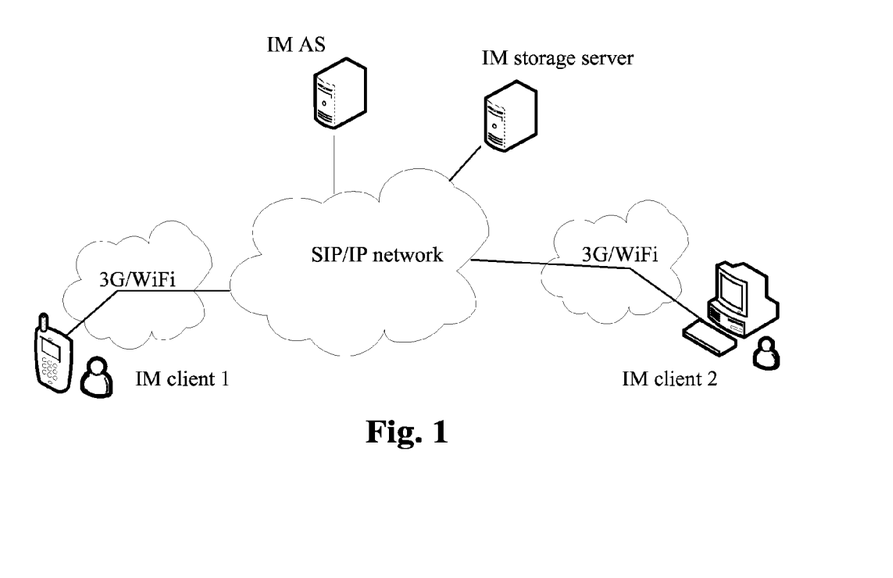
FIG. 1 shows a general architecture diagram of an IM service system based on Session Initial Protocol (SIP) according to an embodiment of the present invention.

Referring to FIG. 1, a general architecture diagram of an IM service system based on SIP according to an embodiment of the present invention is shown. The IM service system can comprise an IM client, an IM server and an SIP/IP core network. In the embodiments of the present invention, an IM-related service logic set located at the network side different from a client is called an IM server uniformly, comprising an IM Application Server (AS) and an IM storage server shown in FIG. 1.

When the IM service system is in the network environment of an IP Multimedia Subsystem (IMS), the SIP/IP network can be an IMS core network, the IM client can be an IMS client, and the IM server is an AS in an IMS based network.

When the IM service system is in the network environment of a CPM system, the IM client is a CPM client, and the IM server is a network entity consisting of a CPM Participating Function (PF) and a Controlling Function (CF), wherein the PF is logically divided into an originating PF and a terminating PF according to the attribution of a CPM user. The CPM storage server, that is, CPM Message Storage (MSS) server, stores the CPM message and the communication history information of a CPM session. In the CPM network environment, the SIP/IP core network can be based on an IMS core network architecture, also can be an SIP network formed by an SIP gateway.

It should be noted that in certain network environments the SIP/IP core network can be a function unit integrated with the IM AS, and the embodiments of the present invention are applicable to this networking condition too.

Figure 2:
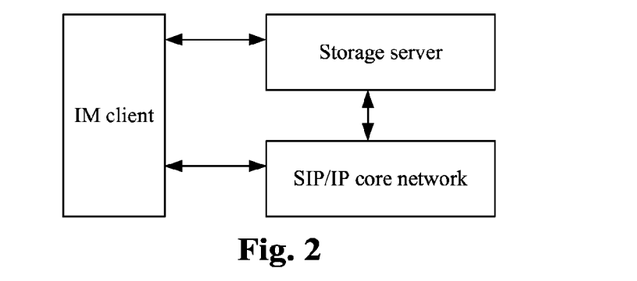
FIG. 2 shows a structure diagram of an IM service system according to an embodiment of the present invention.

In the present invention, the above IM service system and the specific CPM system are called an IM service system uniformly. The client and the server of the IM service system adopt the SIP protocol to interact on the signalling plane, and the IM client and the storage server adopt other protocols in the TCP/IP protocol family, such as IMAP and WebDEV, to interact. A structure of an IM service system according to an embodiment of the present invention is as shown in FIG. 2, comprising: an SIP/IP core network, an IM client and a storage server.

The embodiment of the present invention is illustrated below by taking an IM service system based on SIP protocol for example.

Figure 3:
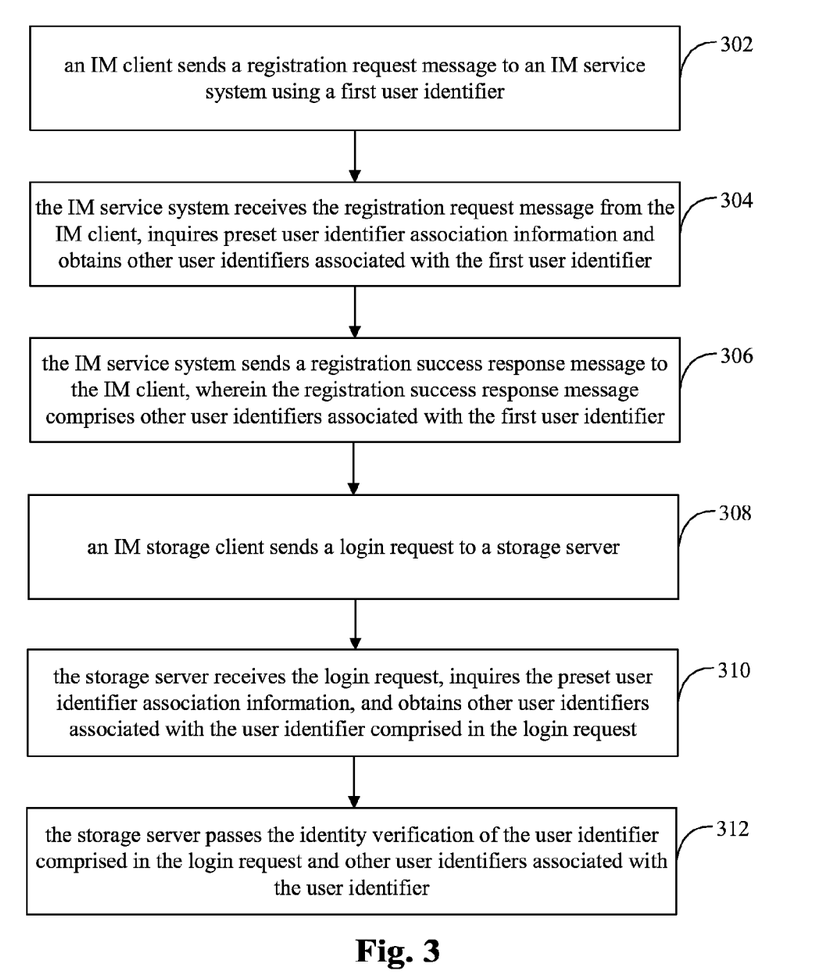
FIG. 3 shows a flowchart of a method for accessing a storage server according to Embodiment 1 of the present invention.

Referring to FIG. 3, a flowchart of a method for accessing a storage server according to Embodiment 1 of the present invention is shown, specifically comprising the following steps.

Step 302: an IM client sends a registration request message to an IM service system using a first user identifier.

Specifically, the IM client sends a registration request message to the IM service system using one user identifier, such as a user address A, to request registration.

Step 304: the IM service system receives the registration request message from the IM client, inquires preset user identifier association information and obtains other user identifiers associated with the first user identifier.

The user identifier association information can be preset in the IM service system in a form of an identifier association table, wherein the table comprises a user and a plurality of user identifiers of the user. The plurality of user identifiers can be divided into one group to correspond to the user, also can be divided into a plurality of groups to correspond to the user respectively.

It should be noted that the registration process triggers the authentication process of the first user identifier and a plurality of user identifiers associated with the first user identifier; at this moment, the IM service system passes the authentication of the first user identifier and a plurality of user identifiers associated with the first user identifier.

Step 306: the IM service system sends a registration success response message to the IM client, wherein the registration success response message comprises other user identifiers associated with the first user identifier.

Step 308: an IM storage client sends a login request to a storage server. The IM storage client is a proxy program, which resides in the IM client, for accessing the storage server; the storage client also can be regarded as one constituent part of the IM client; or, the IM storage client can be a client different from the IM client and can obtain a plurality of user identifiers through the IM client.

The plurality of user identifiers comprise the first user identifier and other user identifiers associated with the first user identifier. The IM storage client can log in the storage server using any one user identifier of the plurality of user identifiers, wherein the sent login request comprises this user identifier.

Step 310: the storage server receives the login request, inquires the preset user identifier association information, and obtains other user identifiers associated with the user identifier comprised in the login request.

Step 312: the storage server passes the identity verification of the user identifier comprised in the login request and other user identifiers associated with the user identifier.

It should be noted that, after passing the authentication of the user identifier comprised in the login request and other user identifiers associated with the user identifier, the storage server passes the identity verification of the user identifier and other user identifiers associated with the user identifier.

Through this embodiment, the problem in the related art that when a user having a plurality of user identifiers accesses a storage server the user must change the user identifier and perform login for several times before accessing the stored information of the plurality of user identifiers is effectively solved. Through the steps of acquiring, through one user identifier of the same user, other user identifiers associated with the user identifier, accessing the storage server using any one user identifier of the user identifier and other user identifiers associated with the user identifier, and searching and obtaining, by the storage server, other user identifiers associated with the logged-in user identifier, the user can access the storage server using one user identifier, thus the system access efficiency is improved and the user experience is enhanced. In addition, since the storage server acquires a plurality of other user identifiers through one user identifier, the burden of the client is reduced and the system setting of the client is simplified.

Figure 4:
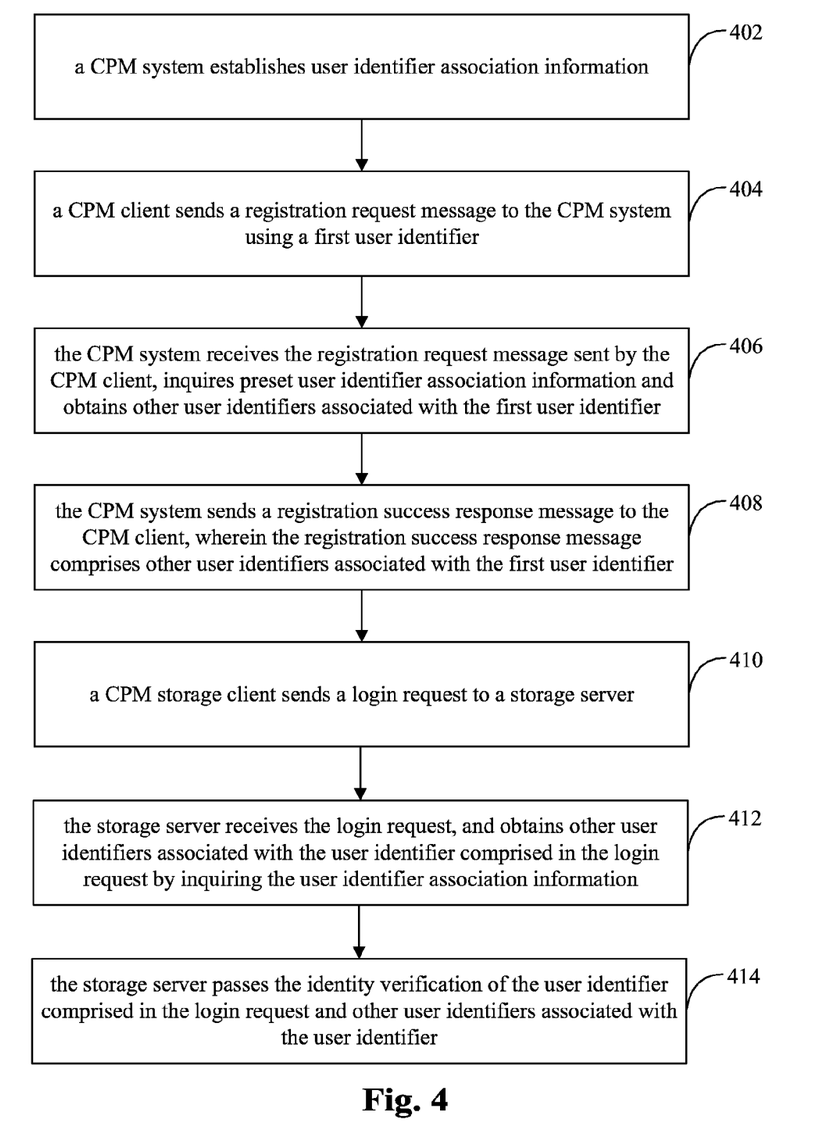
FIG. 4 shows a flowchart of a method for accessing a storage server according to Embodiment 2 of the present invention.

Referring to FIG. 4, a flowchart of a method for accessing a storage server according to Embodiment 2 of the present invention is shown. Embodiment 2 takes a CPM system based on the SIP protocol for example, in which, a CPM client and a storage server adopt an Internet Mail Access Protocol (IMAP) to interact. The method specifically comprises the following steps.

Step 402: a CPM system establishes user identifier association information. The user identifier association information comprises a user and one or more groups of associated user identifiers corresponding to the user.

The CPM IM service system associates a plurality of user identifiers, for example, user addresses, of the same user by a preset method, wherein the plurality of user identifiers of the same user can be divided into one group to be associated, also the plurality of user identifiers of the same user can be divided into multiple groups to be associated; the association information is stored in the CPM system. For example, a user has four user addresses: A, B, C and D, and the user can arrange the four addresses into one group to associate, then the four addresses all correspond to the user; the user also can arrange the user addresses into two groups to associate, for example, A and B are arranged in one group, C and D are arranged in another group, then the group of A and B, and the group of C and D correspond to the user respectively. Those skilled in the art can set the group properly as actually needed, and the present invention has no limitation to the group.

The establishment of user identifier association information enables the CPM system to quickly and conveniently find a plurality of other user identifiers associated with one user identifier, so as to improve the storage access efficiency.

Step 404: a CPM client sends a registration request message to the CPM system using a first user identifier.

The CPM client registers in the CPM system using one user identifier. The embodiment takes the user addresses A and B in Step 402 being associated for example; when a user performs an instant service using the user address A, the CPM client registers in the CPM system using the user address A and sends a registration request message.

In this step, the CPM client registers in the CPM system, specifically, the CPM client adopts the user address A to register and sends a registration request message to the CPM system, wherein the registered user address is A. The registration request message is processed by an SIP/IP core network; the SIP/IP core network obtains the user address B associated with the user address A by inquiring the user identifier association information in an identifier association table.

Step 406: the CPM system receives the registration request message sent by the CPM client, inquires preset user identifier association information and obtains other user identifiers associated with the first user identifier.

After receiving the registration request message sent by the CPM client, the CPM system obtains the user address B associated with the user address A by inquiring the user identifier association information.

It should be noted that the registration process triggers an authentication process simultaneously and the CPM system passes the authentication of the user address A and the user address B simultaneously.

Step 408: the CPM system sends a registration success response message to the CPM client, wherein the registration success response message comprises other user identifiers associated with the first user identifier.

In this step, the registration success response message sent by the CPM system to the CPM client comprises the user address B associated with the user address A.

Step 410: a CPM storage client sends a login request to a storage server.

In this step, the CPM storage client sends a login request to the storage server using any one of the user addresses A and B, for example, user address A.

Step 412: the storage server receives the login request, and obtains other user identifiers associated with the user identifier comprised in the login request by inquiring the user identifier association information.

Particularly, in Embodiment 2, before accessing the storage server, the CPM storage client first logs in an IMAP storage server; after receiving the login request, the IMAP storage server triggers (or notifies) the storage server to inquire about the user addresses associated with the user address A.

In this step, the storage server inquires, through the user address A, the user identifier association information and obtains the user address B associated with the user address A. During this process, the authentication process of the user address A and the user address B by the storage server can be triggered simultaneously. The authentication of the user addresses A and B by the storage server can be implemented by two modes: (1) sharing the authentication of the CPM client in the registration process, for example, the authentication of the CPM client in the registration process generates authentication passed information, the storage server can accomplish the authentication of the user addresses A and B directly by acquiring the authentication passed information; (2) the storage server authenticates the user identifiers independently; for example, the storage server obtains the user address B associated with the user address A by inquiring the user identifier association information, requests the CPM system to authenticate the two user addresses independently and obtains a result of pass, thereby accomplishing the independent authentication of the user addresses A and B.

When the SIP/IP network is based on the IMS architecture, the storage server accesses a Home Subscriber Server (HSS) through a Diameter protocol to acquire a plurality of user identifies. Specifically, the storage server accesses the HSS through the Diameter protocol to acquire the user address A and the user address B.

Step 414: the storage server passes the identity verification of the user identifier comprised in the login request and other user identifiers associated with the user identifier.

A current user of the CPM client can access the storage server based on a plurality of user identifiers (for example A and B) simultaneously by using only one user identifier, for example, user address A.

Figure 5:
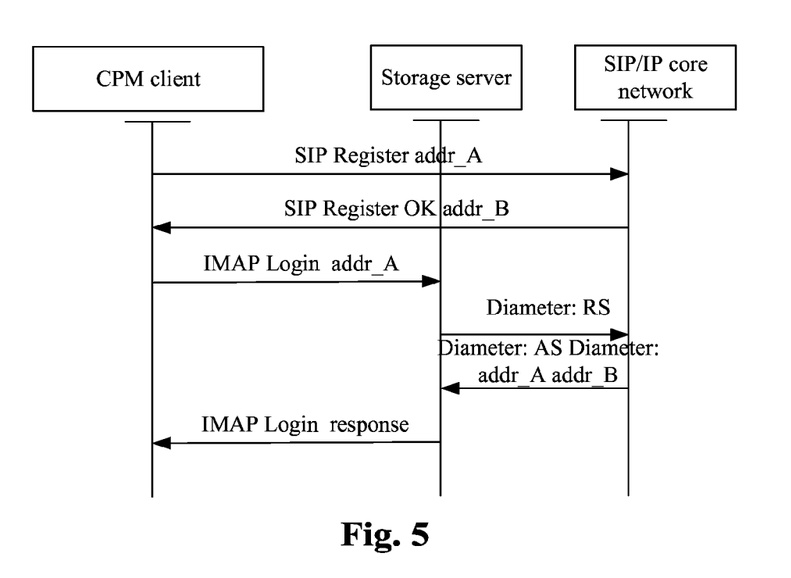
FIG. 5 shows a signalling flowchart of the access method shown in FIG. 4.

The specific signalling flowchart of the access method in Embodiment 2 is as shown in FIG. 5. In FIG. 5, "SIP Register addr_A" is a registration request message sent by the CPM client when registering in the CPM system using the user address A; "SIP Register OK addr_B" is a registration success response message returned by the CPM system to the CPM client, wherein the "SIP Register OK addr_B" contains the user address B associated with the user address A. When the CPM storage client logs in the storage server, after receiving a login request, the storage server inquires from the SIP/IP core network about the user identifier association information by sending "Diameter: RS" to acquire the associated user addresses A and B, then the storage server returns a login response message "IMAP Login response" to the storage client.

The messages "SIP Register addr_A", "SIP Register OK addr_B", "Diameter: RS" and "IMAP Login response" shown in FIG. 5 are only for illustration; in actual application, the messages are based on a Register method of the SIP protocol, a Diameter protocol query command and grammar of a login instruction of IMAP respectively.

Figure 6:
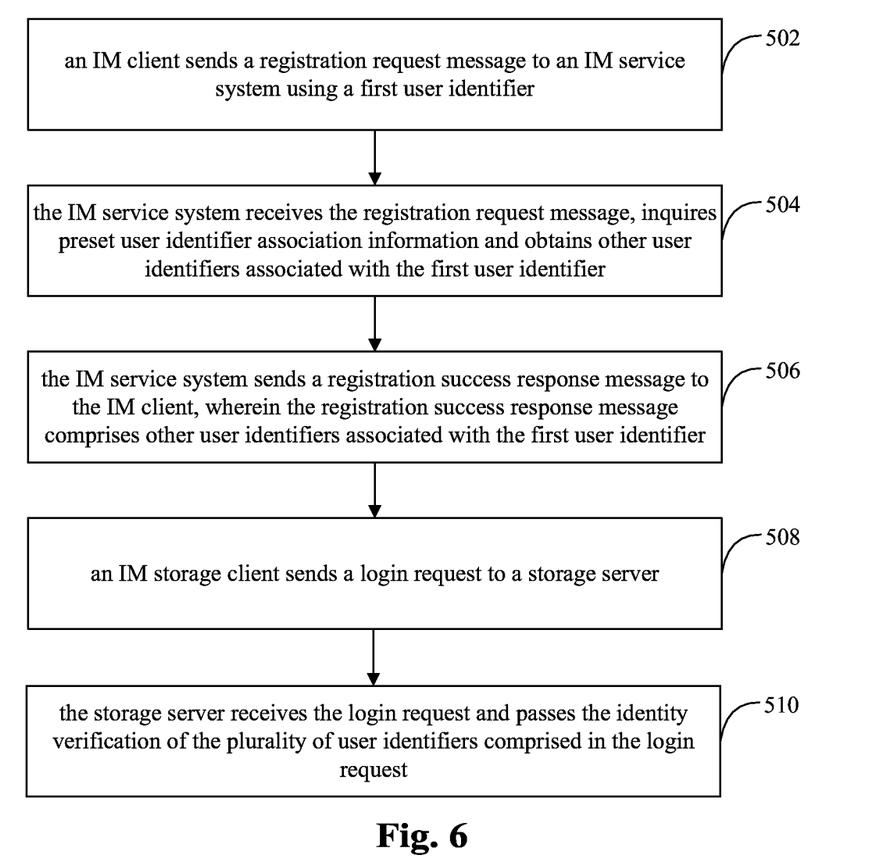
FIG. 6 shows a flowchart of a method for accessing a storage server according to Embodiment 3 of the present invention.

Through the embodiment, a user can use one user identifier to enable a plurality of associated other user identifiers to access a storage server simultaneously, thus the system efficiency is improved and the user experience is enhanced Referring to FIG. 6, a flowchart of a method for accessing a storage server according to Embodiment 3 of the present invention is shown, specifically comprising the following steps.

Step 502: an IM client sends a registration request message to an IM service system using a first user identifier.

Step 504: the IM service system receives the registration request message, inquires preset user identifier association information and obtains other user identifiers associated with the first user identifier.

Step 506: the IM service system sends a registration success response message to the IM client, wherein the registration success response message comprises other user identifiers associated with the first user identifier.

Step 508: an IM storage client sends a login request to a storage server.

The login request comprises a plurality of user identifiers; and the plurality of user identifiers comprise the first user identifier and other user identifiers associated with the first user identifier.

Step 510: the storage server receives the login request and passes the identity verification of the plurality of user identifiers comprised in the login request.

Through this embodiment, the problem in the related art that when a user having a plurality of user identifiers accesses a storage server the user must log in for several times before accessing the stored information of the plurality of user identifiers is effectively solved. The IM client, through one user identifier of the same user, enables the user identifier and other user identifiers associated with the user identifier to access the storage server simultaneously, thus the system access efficiency is improved and the user experience is enhanced.

Figure 7:
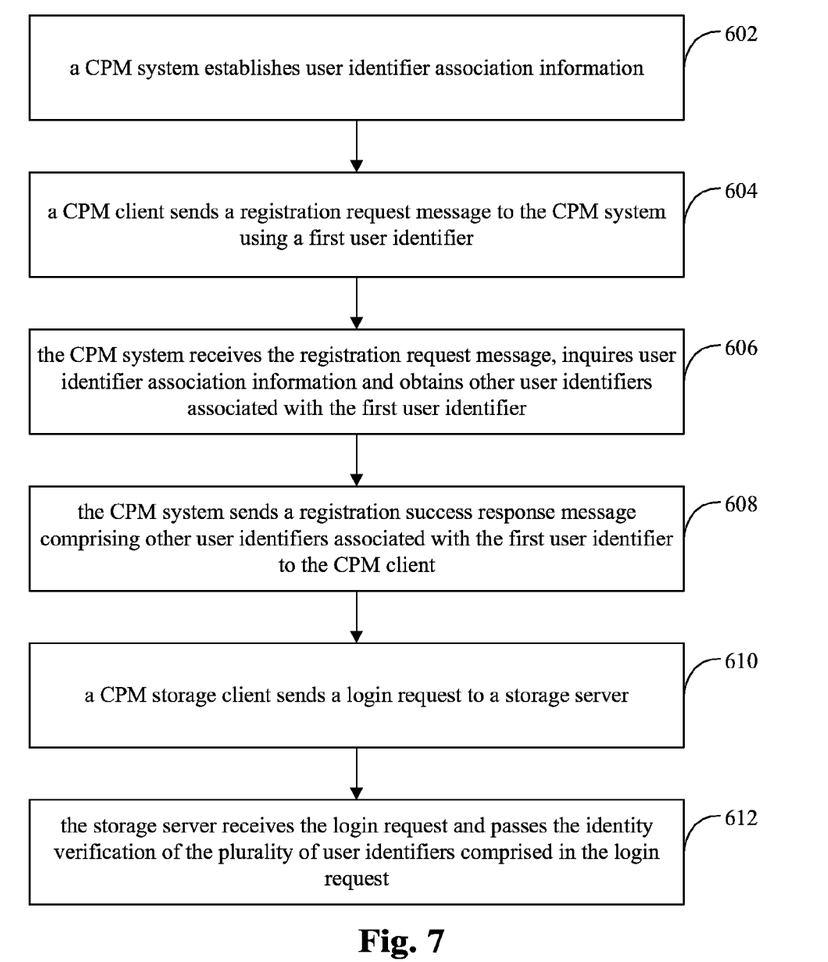
FIG. 7 shows a flowchart of a method for accessing a storage server according to Embodiment 4 of the present invention.

Referring to FIG. 7, a flowchart of a method for accessing a storage server according to Embodiment 4 of the present invention is shown. Embodiment 4 takes a CPM IM service system based on the SIP protocol for example, in which, a CPM client and a storage server adopt an IMAP protocol to interact and the SIP/IP core network is based on an IMS architecture. The method specifically comprises the following steps.

Step 602: a CPM system establishes user identifier association information.

The user identifier association information comprises a user and one or more groups of associated user identifiers of the user.

The establishment of user identifier association information enables the storage server to quickly and conveniently find other user identifiers associated with one user identifier, so as to improve the storage access efficiency.

In Embodiment 4, the SIP/IP core network is based on the IMS architecture, and the identifier association information is recorded in an HSS server in advance.

Step 604: a CPM client sends a registration request message to the CPM system using a first user identifier.

Embodiment 4 takes the user identifiers such as user addresses A, B, C and D of the current user being associated for example. The CPM client registers in the CPM system using the user address A and sends a registration request message.

Step 606: the CPM system receives the registration request message, inquires the user identifier association information and obtains other user identifiers associated with the first user identifier.

In this step, the CPM system obtains the user addresses B, C and D associated with the user address A by inquiring the user identifier association information.

It should be noted that the registration process triggers an authentication process and the CPM system passes the authentication of the user addresses A, B, C and D.

Step 608: the CPM system sends a registration success response message comprising other user identifiers associated with the first user identifier to the CPM client.

In Embodiment 4, the CPM client registers in the CPM system, specifically, the CPM client adopts the user address A to register and sends a registration request message to the CPM system, wherein the registered user address is A. The registration request message is processed by the SIP/IP core network; the SIP/IP core network obtains the user addresses B, C and D associated with the user address A by inquiring the user identifier association information in the HSS server; and the CPM system returns a registration success response message to the CPM client, wherein the message comprises the user addresses B, C and D associated with the user address A. At this moment, the user addresses A, B, C and D of the CPM client are registered successfully once.

Step 610: a CPM storage client sends a login request to a storage server.

The login request comprises a plurality of user identifiers, wherein the plurality of user identifiers comprise the first user identifier and other user identifiers associated with the first user identifier.

In Embodiment 4, the CPM storage client, which resides in the CPM client, sends a login request to the storage server and accesses the message storage server (MSS) using the user addresses A, B, C and D simultaneously.

Step 612: the storage server receives the login request and passes the identity verification of the plurality of user identifiers comprised in the login request.

After the storage server receives the login request, an authentication process of the plurality of user identifiers is triggered. The authentication can be implemented by sharing the authentication of the CPM client in the registration process, also can be implemented by authenticating the plurality of user identifiers independently by the storage server.

With the embodiment, a user can obtain the stored information of a plurality of associated user identifiers by using one user identifier, thus the system efficiency is improved and the user experience is enhanced.

Referring to FIG. 2 again, an IM service system according to an embodiment of the present invention comprises: an IM client, an IM storage client and a storage server.

The IM client is configured to send a registration request message to an IM service system using a first user identifier and receive a registration success response message sent by the IM service system, wherein the registration success response message comprises other user identifiers associated with the first user identifier and obtained by the IM service system by inquiring preset user identifier association information.

The IM storage client is configured to send a login request to a storage server 804, wherein the login request comprises any one user identifier of the plurality of user identifiers, wherein the plurality of user identifiers comprise the first user identifier and other user identifiers associated with the first user identifier. In the embodiment, the IM storage client is a proxy program, which resides in the IM client, for accessing the storage server; the storage client also can be viewed as a constituent part of the IM client. However, those skilled in the art should understand that the IM storage client also can be a client different from the IM client.

The storage server is configured to receive the login request of the IM storage client, inquire the preset user identifier association information, obtain other user identifiers associated with the user identifier comprised in the login request, and pass the identity verification of the user identifier comprised in the login request and other user identifiers associated with the user identifier.

For example, an IM client registers in an IM service system using a first user identifier and sends a registration request message; the IM service system inquires user identifier association information, obtains other user identifiers associated with the first user identifier and sends a registration success response message to the IM client, wherein the registration success response message comprises other user identifiers associated with the first user identifier; then an IM storage client sends a login request to a storage server using any one user identifier of the plurality of user identifiers; the storage server receives the login request and passes the identity verification of the plurality of user identifiers.

Preferably, the IM client is further configured to request the IM service system to authenticate the first user identifier and other user identifiers associated with the first user identifier.

Preferably, the storage server is further configured to acquire from the IM service system an authentication result of the user identifier comprised in the login request and other user identifiers associated with the user identifier and accomplish the authentication of the user identifier comprised in the login request and other user identifiers associated with the user identifier; or, the storage server is further configured to authenticate the user identifier comprised in the login request and other user identifiers associated with the user identifier, wherein the authentication of the user identifiers by the storage server is independent of the authentication of the user identifiers by the IM service system.

Referring to FIG. 2 again, another IM service system according to the embodiment of the present invention comprises: an IM client, an IM storage client and a storage server.

The IM client is configured to send a registration request message to an IM service system using a first user identifier and receive a registration success response message from the IM service system, wherein the registration success response message comprises other user identifiers associated with the first user identifier and obtained by the IM service system by inquiring preset user identifier association information.

The IM storage client is configured to send a login request to a storage server, wherein the login request comprises a plurality of user identifiers, wherein the plurality of user identifiers comprise the first user identifier and other user identifiers associated with the first user identifier. In the embodiment, the IM storage client is a proxy program, which resides in the client, for accessing the storage server; the storage client also can be viewed as a constituent part of the IM client. However, those skilled in the art should understand that the IM storage client also can be a client different from the IM client.

The storage server is configured to receive the login request and pass the identity verification of the plurality of user identifiers comprised in the login request.

For example, an IM client sends a registration request to an IM service system using a first user identifier; after receiving the request, the IM service system inquires user identifier association information, obtains other user identifiers associated with the first user identifier and sends a registration success response message to the IM client, wherein the registration success response message comprises other user identifiers associated with the first user identifier and obtained by the IM service system by inquiring preset user identifier association information; then an IM storage client sends a login request to a storage server, wherein the login request comprises a plurality of user identifiers; the storage server receives the login request and passes the identity verification of the plurality of user identifiers.

Preferably, the IM client is further configured to request the IM service system to authenticate the first user identifier and other user identifiers associated with the first user identifier.

Preferably, the storage server is further configured to acquire an authentication result of the user identifier and other user identifiers associated with the user identifier comprised in the login request from the IM service system and accomplish the authentication of the plurality of user identifiers comprised in the login request; or, the storage server is further configured to authenticate the plurality of user identifiers comprised in the login request, wherein the authentication of the user identifiers by the storage server is independent of the authentication of the user identifiers by the IM service system.

With the embodiment of the present invention, a user having a plurality of user identifiers of an IM client can conveniently access a storage server and perform IM communication.

The access of a user having a plurality of user identifiers of the IMS based IM service system and other SIP protocol based IM service systems to a storage server is similar to that of the embodiments of the present invention, and no further description is needed here.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the steps of the present invention can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the present invention is not restricted to any particular hardware and software combination.

The descriptions above are only the preferable embodiment of the present invention, which are not used to restrict the present invention. For those skilled in the art, the present invention may have various changes and variations. Any amendments, equivalent substitutions, improvements, etc. within the principle of the present invention are all included in the scope of the protection of the present invention.

What is claimed is:

1. A method for accessing a storage server of an Instant Message (IM) service system, comprising the steps of:
   an IM client sending a registration request message to the IM service system using a first user identifier;
   after receiving the registration request message from the IM client, the IM service system inquiring preset user identifier association information and obtaining other user identifiers associated with the first user identifier;
   the IM service system sending a registration success response message to the IM client, wherein the registration success response message comprises other user identifiers associated with the first user identifier;
   an IM storage client sending a login request to the storage server, wherein the login request comprises any one of a plurality of user identifiers, wherein the plurality of user identifiers comprise the first user identifier and other user identifiers associated with the first user identifier;
   the storage server receiving the login request of the IM storage client, inquiring the preset user identifier association information, and obtaining other user identifiers associated with the user identifier comprised in the login request; and
   the storage server passing identity verification of the user identifier comprised in the login request and other user identifiers associated with the user identifier.

2. The method according to claim 1, wherein before the step of the IM service system sending the registration success response message to the IM client, the method further comprises a step of:
   the IM service system accomplishing authentication of the first user identifier and other user identifiers associated with the first user identifier;
   before the step of the storage server passing the identity verification of the user identifier comprised in the login request and other user identifiers associated with the user identifier, the method further comprises a step of:
   the storage server accomplishing authentication of the user identifier comprised in the login request and other user identifiers associated with the user identifier.

3. The method according to claim 2, wherein the step of the storage server accomplishing the authentication of the user identifier comprised in the login request and other user identifiers associated with the user identifier comprises a step of:
   the storage server acquiring an authentication result of the IM service system and accomplishing the authentication of the user identifier comprised in the login request and other user identifiers associated with the user identifier; or,
   the storage server authenticating the user identifier comprised in the login request and other user identifiers associated with the user identifier, wherein the authentication of the user identifiers by the storage server is independent of the authentication of the user identifiers by the IM service system.

4. The method according to claim 1, wherein the step of the IM service system inquiring the preset user identifier association information and obtaining other user identifiers associated with the first user identifier comprises a step of:
   the IM service system searching, in the preset user identifier association information, for a user corresponding to the first user identifier and obtaining the user's other user identifiers associated with the first user identifier.

5. The method according to claim 1, wherein the step of the storage server inquiring the preset user identifier association information and obtaining other user identifiers associated with the user identifier comprised in the login request comprises a step of:
   the storage server searching, in the preset user identifier association information, for a user corresponding to the user identifier comprised in the login request and obtaining the user's other user identifiers associated with the user identifier comprised in the login request.

6. A method for accessing a storage server of an IM service system, comprising the steps of:
   an IM client sending a registration request message to the IM service system using a first user identifier;
   after receiving the registration request message from the IM client, the IM service system inquiring preset user identifier association information and obtaining other user identifiers associated with the first user identifier;
   the IM service system sending a registration success response message to the IM client, wherein the registration success response message comprises other user identifiers associated with the first user identifier;
   an IM storage client sending a login request to a storage server, wherein the login request comprises a plurality of user identifiers, wherein the plurality of user identifiers comprise the first user identifier and other user identifiers associated with the first user identifier; and
   the storage server receiving the login request and passing identity verification of the plurality of user identifiers comprised in the login request.

7. The method according to claim 6, wherein before the step of the IM service system sending the registration success response message to the IM client, the method further comprises a step of:
   the IM service system accomplishing authentication of the first user identifier and other user identifiers associated with the first user identifier;
   before the step of the storage server passing the identity verification of the plurality of user identifiers comprised in the login request, the method further comprises a step of:
   the storage server accomplishing authentication of the plurality of user identifiers comprised in the login request.

8. The method according to claim 7, wherein the step of the storage server accomplishing the authentication of the plurality of user identifiers comprised in the login request comprises a step of:
   the storage server acquiring an authentication result of the IM service system and accomplishing the authentication of the user identifier and other user identifiers associated with the user identifier comprised in the login request;

or, the storage server authenticating the user identifier and other user identifiers associated with the user identifier comprised in the login request, wherein the authentication of the user identifiers by the storage server is independent of the authentication of the user identifiers by the IM service system.

9. The method according to claim 6, wherein the step of the IM service system inquiring the preset user identifier association information and obtaining other user identifiers associated with the first user identifier comprises a step of:

the IM service system searching, in the preset user identifier association information, for a user corresponding to the first user identifier and obtaining the user's other user identifiers associated with the first user identifier.

10. An IM service system, comprising:

an IM client, comprising a first hardware processor configured to send a registration request message to the IM service system using a first user identifier and receive a registration success response message sent by the IM service system, wherein the registration success response message comprises other user identifiers associated with the first user identifier and obtained by the IM service system through inquiring preset user identifier association information;

an IM storage client, comprising a second hardware processor configured to send a login request to a storage server, wherein the login request comprises any one of a plurality of user identifiers, wherein the plurality of user identifiers comprise the first user identifier and other user identifiers associated with the first user identifier; and the storage server, comprising a third hardware processor configured to receive the login request of the IM storage client, inquire the preset user identifier association information, obtain other user identifiers associated with the user identifier comprised in the login request, and pass identity verification of the user identifier comprised in the login request and other user identifiers associated with the user identifier.

11. The system according to claim 10, wherein the first hardware processor of the IM client is further configured to request the IM service system to authenticate the first user identifier and other user identifiers associated with the first user identifier.

12. The system according to claim 10, wherein the third hardware processor of the storage server is further configured to acquire an authentication result of the user identifier comprised in the login request and other user identifiers associated with the user identifier from the IM service system, and accomplish the authentication of the user identifier comprised in the login request and other user identifiers associated with the user identifier;

or, the third hardware processor of the storage server is further configured to authenticate the user identifier comprised in the login request and other user identifiers associated with the user identifier, wherein the authentication of the user identifiers by the storage server is independent of the authentication of the user identifiers by the IM service system.

13. An IM service system, comprising:

an IM client, comprising a first hardware processor configured to send a registration request message to the IM service system using a first user identifier and receive a registration success response message from the IM service system, wherein the registration success response message comprises other user identifiers associated with the first user identifier and obtained by the IM service system by inquiring preset user identifier association information;

an IM storage client, comprising a second hardware processor configured to send a login request to a storage server, wherein the login request comprises a plurality of user identifiers, wherein the plurality of user identifiers comprise the first user identifier and other user identifiers associated with the first user identifier; and the storage server, comprising a third hardware processor configured to receive the login request and pass identity verification of the plurality of user identifiers comprised in the login request.

14. The system according to claim 13, wherein the first hardware processor of the IM client is further configured to request the IM service system to authenticate the first user identifier and other user identifiers associated with the first user identifier.

15. The system according to claim 13, wherein the third hardware processor of the storage server is further configured to acquire an authentication result of the user identifier and other user identifiers associated with the user identifier comprised in the login request from the IM service system, and accomplish authentication of the plurality of user identifiers comprised in the login request;

or, the third hardware processor of the storage server is further configured to authenticate the plurality of user identifiers comprised in the login request, wherein the authentication of the user identifiers by the storage server is independent of the authentication of the user identifiers by the IM service system.

\* \* \* \* \*